United States Patent
Fogle

(10) Patent No.: US 9,095,091 B1
(45) Date of Patent: Aug. 4, 2015

(54) STALK REDUCING BAR AND MOWER HAVING A STALK REDUCING BAR

(71) Applicant: John Robert Fogle, Pisgah Forest, NC (US)

(72) Inventor: John Robert Fogle, Pisgah Forest, NC (US)

( * ) Notice: Subject to any disclaimer, the term of this patent is extended or adjusted under 35 U.S.C. 154(b) by 0 days.

(21) Appl. No.: 14/685,073

(22) Filed: Apr. 13, 2015

Related U.S. Application Data

(63) Continuation of application No. 14/495,243, filed on Sep. 24, 2014, now Pat. No. 9,003,754, and a continuation of application No. 13/154,374, filed on Jun. 6, 2011, now abandoned.

(51) Int. Cl.
*A01D 34/73* (2006.01)

(52) U.S. Cl.
CPC .................................... *A01D 34/73* (2013.01)

(58) Field of Classification Search
CPC ... A01D 34/73; A01D 34/733; A01D 34/005; A01D 34/64; A01D 34/82; A01D 34/76; A01D 75/00; A01D 2101/00
USPC ........ 56/17.5, 17.6, 255, 295; 172/40–42, 96, 172/111; 15/49.1, 90
See application file for complete search history.

(56) References Cited

U.S. PATENT DOCUMENTS

| | | |
|---|---|---|
| 2,737,003 A | 3/1956 | Beers |
| 2,924,059 A | 2/1960 | Beeston |
| 3,247,657 A | 4/1966 | Scarnato et al. |
| 3,315,451 A | 4/1967 | Hill |
| 3,340,682 A | 9/1967 | Ely |
| 3,444,675 A | 5/1969 | Freedlander et al. |
| 3,538,692 A | 11/1970 | Cope et al. |
| 3,910,017 A | 10/1975 | Thorud et al. |
| 4,297,831 A | 11/1981 | Pioch |
| 4,862,682 A | 9/1989 | Wait et al. |
| 5,291,725 A | 3/1994 | Meinerding |
| 5,452,569 A | 9/1995 | Anderson |
| 5,515,670 A | 5/1996 | Meinerding |
| 6,840,030 B1 | 1/2005 | Monaco |
| 8,615,977 B2 | 12/2013 | Campione |
| 2002/0152736 A1 | 10/2002 | Hasei et al. |
| 2004/0112028 A1 | 6/2004 | Duncan et al. |
| 2010/0000193 A1 | 1/2010 | De Benedetto et al. |

*Primary Examiner* — Robert Pezzuto
(74) *Attorney, Agent, or Firm* — Smith Moore Leatherwood LLP; Thomas W. Epting; Matthew S. Bedsole

(57) ABSTRACT

A stalk reducer bar and an assembly that supports, transports, and rotatably drives a stalk reducer bar in typical environments in which an area of vegetation is to be trimmed are provided. The stalk reducer bar reduces the size of cut stalk segments such as grass stalk segments generated during a lawn mowing operation and includes a carrier body. The carrier body includes a further working portion having a plurality of projections. Angular movement of the carrier body in the cutting plane operates to bring the first blade section into stalk cutting engagement with stalks extending from the surface supporting organic matter thereon and operates to bring the plurality of projections of the further working portion into shredding engagement with cut stalks.

18 Claims, 16 Drawing Sheets

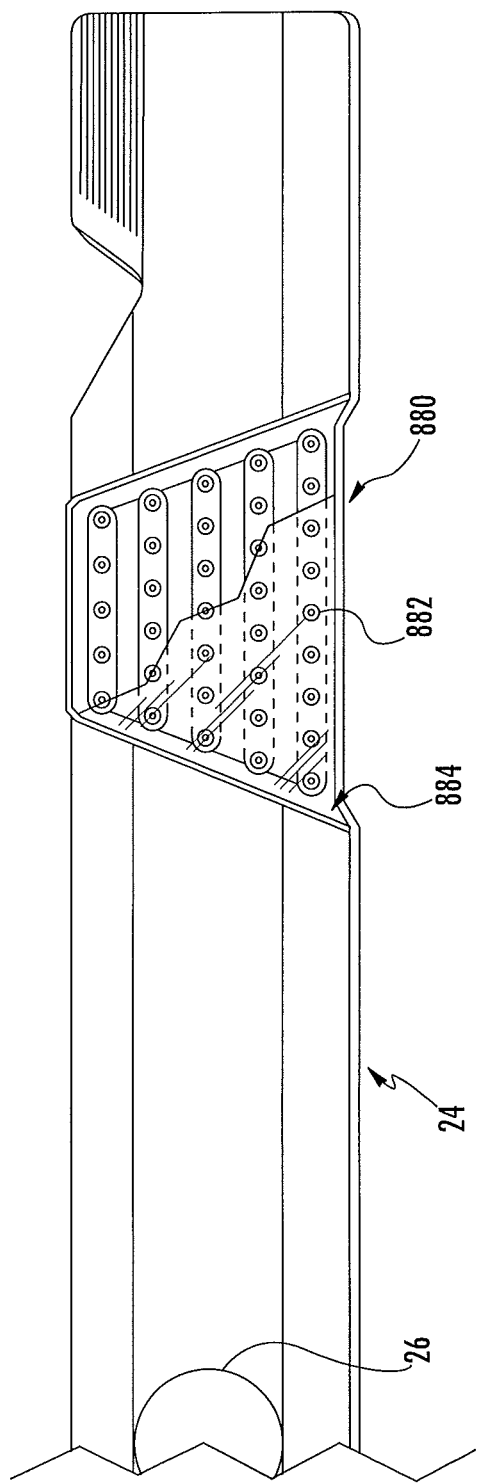

US 9,095,091 B1

STALK REDUCING BAR AND MOWER HAVING A STALK REDUCING BAR

RELATED APPLICATIONS

This application is a continuation application and claims benefit of U.S. nonprovisional application Ser. No. 14/495,243, filed Sep. 24, 2014, a continuation of U.S. nonprovisional application Ser. No. 13/154,374, filed Jun. 6, 2011, and the entirety of the foregoing nonprovisional applications are incorporated herein by reference.

BACKGROUND OF THE INVENTION

Background

Grass cutting operations are regularly performed on expanses of manicured grass such as, for example, a lawn of a residence, a commercial facility, or the like. Such grass cutting operations may include not only trimming or cutting the grass to a uniform height but also include collecting the cut grass clippings as well as collecting twigs, leaves, and other organic or non-organic items that may be present on the lawn during the grass cutting operation. For a number of reasons, including the desire to avoid adding to the size of landfills and the desire to more fully reap the ecological benefits of further utilizing the nutrient value of cut grass clippings, grass cutting operations increasingly omit the step of collecting the cut grass clippings and instead seek to leave the cut grass clippings "in place"—that is, distributed on and among the freshly cut "below cut level" grass of the lawn.

Manufacturers of grass cutting equipment have responded to this evolving grass cutting approach by offering motorized lawn mowers as well as specialized lawn mower blades that, it is claimed, operate to handle the cut grass clippings in a way that does not interfere with the grass cutting operation and/or promotes effective distribution of the cut grass clippings on the lawn. For example, lawn mowers are commercially available that are equipped with mulching blades operable to mulch the grass into relatively fine clippings such that these clippings will allegedly migrate downwardly into the "below cut level" grass and thus not mar the appearance of the lawn with unsightly clumps or clusters of cut grass clippings. In addition, it is also possible to outfit a lawn mower with shredding blades with custom shaped tines or cutting edges that allegedly shred leaves, twigs, and other organic matter into reduced size pieces that will migrate downwardly into the "below cut level" grass.

However, some mulching blades fail to properly shred leaves or organic matter as mulching blades are designed specifically to mulch grass and have only secondary shredding capability. In addition, some shredding blades fail to provide an adequate mulching of the grass itself although adequate to shred leaves or other non-grass organic matter. Mulching blades often require the deck of the lawn mower (the enclosed volume in which a cutting blade rotates) to be closed to thereby retain large grass particles within the deck until cut into finer pieces. A mulching blade of this type is intended to lift, cut, mulch, and distribute the finely cut grass clippings. However, a number of factors such as the forward (translational) movement of the lawn mower, the lack of effective upward suction, the increasing dullness of the mulching blade, and interaction of the upstanding grass blades with the rotating blade can all detract from the capability of a mulching blade to effectively cut grass in a manner that results in a uniformly cut lawn and adequately mulched cut grass clippings.

SUMMARY OF THE INVENTION

The present invention solves the above-mentioned problems by providing an improved blade having combined shredding and mulching features. The single blade effectively mulches grass and shreds leaves and debris, allowing the operator to achieve a finely manicured lawn in a single pass. No time is spent deciding on which blade to use or changing blades to suit the condition of the yard. Furthermore, there is no need to undertake separate shredding and mulching passes. More specifically, the invention provides a stalk reducer bar and an assembly that supports, transports, and rotatably drives a stalk reducer bar in typical environments in which an area of vegetation is to be trimmed are provided. The stalk reducer bar reduces the size of cut stalk segments such as grass stalks segments generated during a lawn mowing operation and includes a carrier body. The carrier body includes a further working portion having a plurality of projections and angular movement of the carrier body in the cutting plane operates to bring the first blade section into stalk cutting engagement with stalks extending from the surface supporting organic matter thereon and operates to bring the plurality of projections of the further working portion into shredding engagement with cut stalks.

BRIEF DESCRIPTION OF THE DRAWINGS

Other features and advantages of the invention will become apparent to those skilled in the art upon review of the following detailed description, claims, and drawings.

FIG. 12 is a front elevational sectional view of a portion of the deck of the rotary mower taken along lines XII-XII of FIG. 1;

FIG. 13 is a bottom elevational view of a portion of the stalk reducer bar;

DETAILED DESCRIPTION OF AN EMBODIMENT

Figure 1:
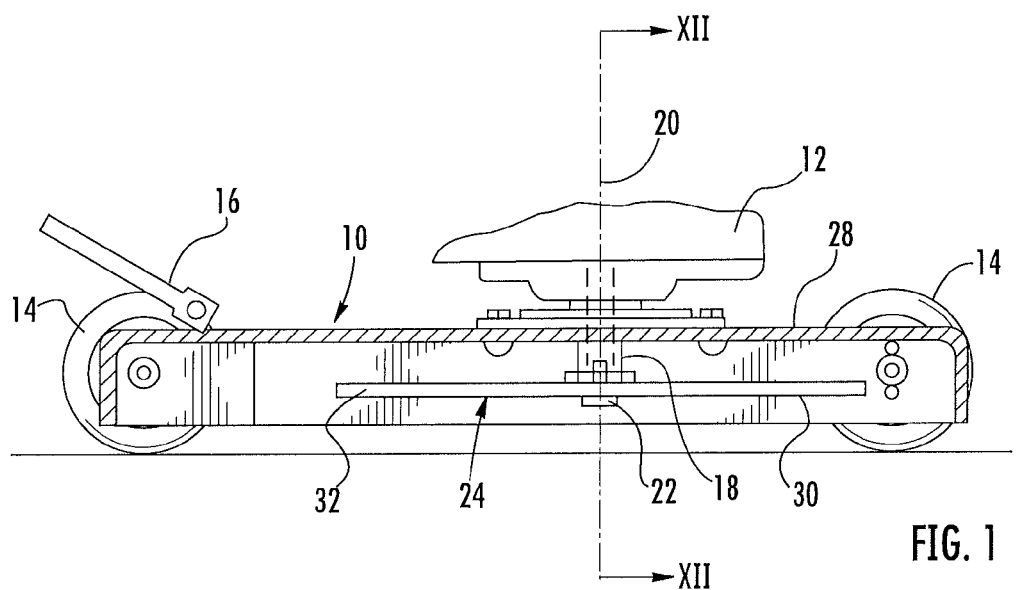
FIG. 1 is a side elevational view in partial section of a rotary mower of the present invention.

The present invention relates to a stalk reducer bar and an assembly that supports, transports, and rotatably drives a stalk reducer bar in typical environments in which an area of vegetation is to be trimmed. The concept of "trimming" an area of vegetation as discussed herein is to be understood as referring to applying a mechanical force to organic matter comprised in an area of vegetation for the purpose of reducing the size of a selected individual organic matter item or a group of organic matter items. For example, "trimming" an area of vegetation as used herein can refer to a lawn mowing operation that typically includes applying a mechanical force (a rotating bar) to a group of individual stalks of grass (a group of organic matter items) for the purpose of reducing the height (size) of each of the grass stalks to a uniform height. In the interest of providing a context for understanding the structure and operation of a stalk reducer bar of the present invention, an assembly that supports, transports, and rotatably drives a stalk reducer bar will initially be described and a representative embodiment of such an assembly is a rotary mower particularly suited for a lawn mowing operation. Also, the term "trimmed" as used herein in connection with an item refers to an organic matter item such as a rooted grass stalk growing from a bed of soil that continues to be rooted in the bed of soil following a trimming operation while the term "cut" as used herein in connection with an item refers to an item that has been severed from another item and is not rooted or otherwise secured to a substrate such as a bed of soil. With reference to FIG. 1, which is a side elevational view in partial section of a rotary mower, a rotary mower particularly suited for a lawn mowing operation is comprised of a drive motor supported by a plurality of wheels, a rotation drive shaft having a rotation axis oriented substantially perpendicularly with respect to an area of vegetation to be mowed, the rotation drive shaft being rotatably driven by the drive motor, and a stalk reducer bar, the stalk reducer bar for reducing the size of individual stalks within the area of vegetation to be mowed. The rotary mower shown in FIG. 1, generally designated as a rotary lawn mower 10, has a motor 12 mounted to the topside of a deck 28. The deck 28, which is shown in a cut-away view in FIG. 1 taken along the front to back centerline of the rotary mower 10, has four individual mounting holes each of which retains an axle bolt of a respective wheel 14, whereupon the rotary mower 10 can be rolled on its wheels 14 along a lawn to be mowed when a user applies a forward or backward motion force to a handle 16 that extends upwardly from the deck 28. The drive motor 12 may be configured as a conventional two- or four-cycle gasoline internal combustion engine and has an output shaft 18 adapted to rotate about a rotation axis 20 oriented substantially perpendicularly with respect to an area of vegetation to be mowed. A stalk reducer bar 24 includes a central bore 26 through which a mounting bolt 22 passes and the mounting bolt 22 is threadably engaged to the lower end of the output shaft 18.

The deck 28 of the rotary mower is configured with a depending skirt to contain the outwardly thrown organic matter such as cut grass stalks that occur during a lawn mowing operation. The depending skirt forms an annulus that cooperates with the rotation path of the stalk reducer bar 24. Although not shown in FIG. 1, a discharge chute can be optionally provided that tangentially extends to the side and rearward relative to the forward direction of the rotary mower and that is communicated with the interior of the deck 28. Likewise, although not shown in FIG. 1, a grass collecting bag can be provided that can be removably secured to an exit end of the discharge chute for capturing and retaining cast-out organic matter that has been propelled outward of the deck 28 and along the discharge chute. Thus, as conventionally known, the rotary mower 10 may be of the rotary type and be operable to move grass clippings or other cut stalk remnant around at least a portion of the annulus formed by the deck 28 and out the respective side discharge chute or rear discharge chute.

Figure 2:
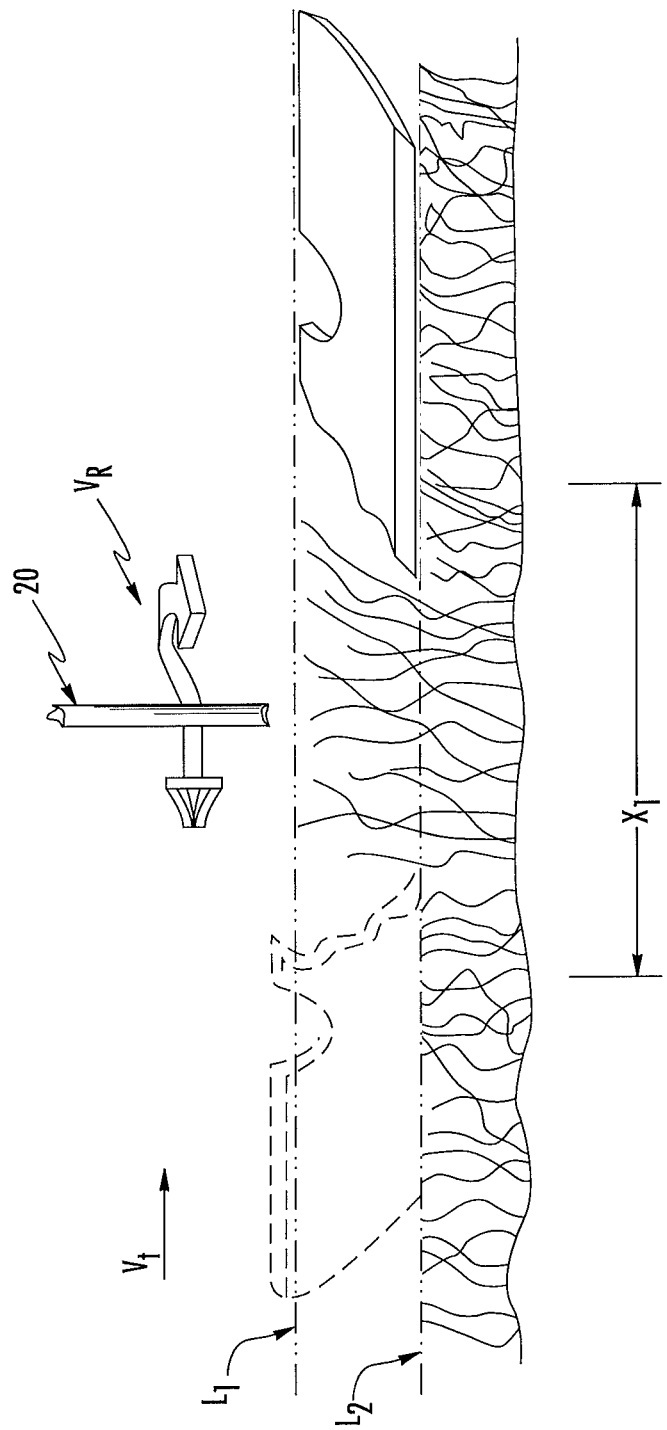
FIG. 2 is a is a side view of the rotary mower shown in FIG. 1 as it moves translationally.

The stalk reducer bar of the present invention is particularly configured to accomplish a size reduction of grass stalks typically found in a lawn such that the remnants of the cut grass stalks are well suited to operate as "mulch" on and in the trimmed grass stalks of the lawn. The desired goal is that the mulch characteristics of these cut grass stalk remnants are favorable both from the point of view of contributing to the nutritional support of the lawn and the point of view of not diminishing the manicured or well kept appearance of the lawn. The capability of the stalk reducer bar of the present invention to provide cut grass stalk remnants with these beneficial characteristic will be seen in the hereafter following description of several configurations of the stalk reducer bar. However, as an aid to better understanding the dynamic conditions under which grass stalks are trimmed by the stalk reducer bar of the present invention, several operating events are now described that occur during a forward movement of the rotary mower (referred to as a "translational" movement) while the stalk reducer bar 24 is drivingly rotated by the drive motor 12. With reference to FIG. 2, which is a side view of the rotary mower as it moves translationally, the stalk reducer bar 24 is rotated clockwise at a rotational speed $V_R$ about the rotation axis 20, while the rotary mower is moved at a translational speed $V_T$ along the surface of the lawn (the translational speed $V_T$ is also a directional vector showing the forward motion of the rotary mower across the lawn). The stalk reducer bar 24 is shown in solid lines as it passes over the incoming grass stalks lying in the forward motion path of the rotary mower along the lawn and is shown in broken lines as it passes over the already trimmed grass stalks following a further one hundred and eighty (180) degrees of rotational movement about the rotation axis 20. The untrimmed height level $L_1$, which is shown as a broken line comprised of line segments interrupted by three dash break points, represents the approximate level of grass or vegetation before it has been trimmed by the stalk reducer bar 24 and the trimmed height level $L_2$, which is shown as a broken line comprised of line segments interrupted by two dot break points, represents the approximate level of grass or vegetation after it has been trimmed by the stalk reducer bar 24. The travel increment $X_1$ represents a translational distance covered by the rotary mower in one complete turn (a turn of three hundred and sixty degrees) of the stalk reducer bar 24. The travel increment $X_1$ varies as a function of the rotational speed $V_R$ and the translational speed $V_T$ of the stalk reducer bar 24. If an operator were to propel the rotary mower 10 at a translational speed $V_T$ along the surface of the lawn of say, between 3 to 4 miles per hour (mph), and if the stalk reducer bar 24 were to rotating clockwise at a typical rotational speed $V_R$ about the rotation axis 20, then the stalk reducer bar 24 would complete approximately three full revolutions between the time that the stalk reducer bar first travels above the root of a grass stalk and the time that the stalk reducer bar has past beyond the root of the respective grass stalk.

Figure 3:
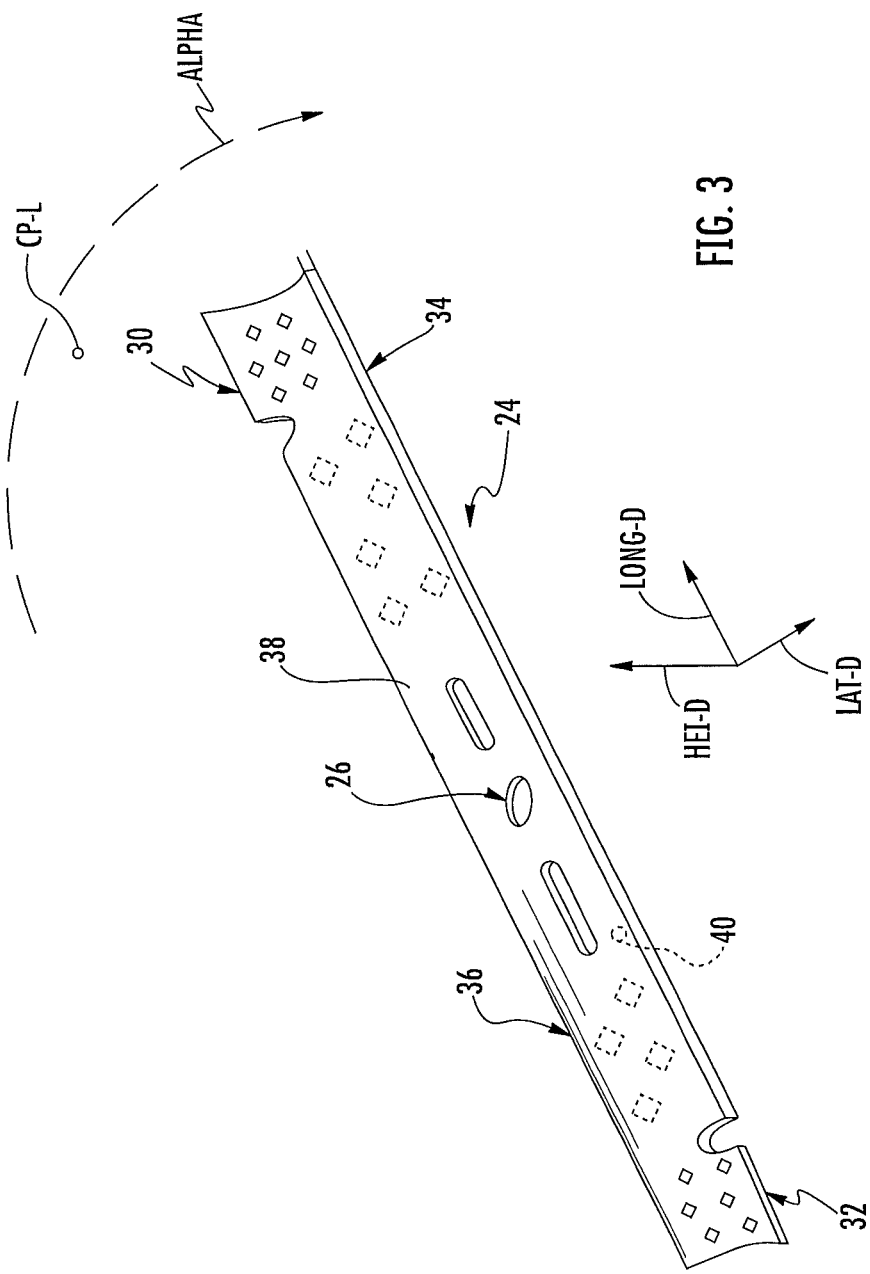
FIG. 3 is a top perspective view of the stalk reducer bar of the present invention.

Having now described the rotary mower which is operable as to transport the stalk reducer bar in a trimming pattern chosen by a user and to drivingly rotate the stalk reducer bar during this trimming pattern movement, the structure and operation of the stalk reducer bar will now be described in detail. With reference to FIG. 3, which is a top perspective view of the stalk reducer bar, the stalk reducer bar 24 is in the form of a carrier body having a drive connect portion formed in a central portion of the stalk reducer bar as viewed along a longitudinal axis and the drive connect portion is in the spe- cific configuration of the central bore 26 through which the shaft bolt 22 is disposed for threading engagement of the shaft bolt in a tapped hole in the drive shaft 18 extending from the drive motor 12. The stalk reducer bar 24 has a first outboard end 30 delimiting a terminus at one longitudinally outermost location that is longitudinally spaced from the drive connect portion and a second outboard end 32 delimiting another terminus at an opposite longitudinally outermost location that is longitudinally spaced from the drive connect portion. The first outboard end 30 of the carrier body of the stalk reducer bar 24 is specifically configured as a first blade section and the second outboard end 32 of the carrier body of the stalk reducer bar 24 is specifically configured as a second blade section. Each of the first and second blade sections comprises a cutting edge that is tapered at a suitably small angle (typically and preferably no greater than thirty degrees)(30°) to comprise a sharpened cutting edge that extends partially or fully along the longitudinal extent of the stalk reducer bar 24.

It is to be understood that the stalk reducer bar 24, in its configuration as a carrier body, may be referred to herein as a "carrier body." The carrier body is angularly moved through a cutting plane C-PL intermediate the drive motor of the rotary lawnmower and a surface supporting organic matter thereon with one lateral edge of the carrier body (i.e., the first outboard end 30) forming a first leading edge 34 of the carrier body and another edge of the carrier body (i.e., the second outboard end 32) forming a second leading edge 36 of the carrier body. The carrier body has a width dimension WID-D perpendicular to its length dimension LENGTH-D and lying in the plane of angular movement of the carrier body (i.e., the cutting plane C-PL) and a thickness dimension THK-D perpendicular to both its length dimension LENGTH-D and its width dimension WID-D. The drive connect portion of the carrier body is operatively connectable to the output shaft 18 of the drive motor 12 of the rotary mower 10 that is rotated by the rotary mower about its rotation axis 20 such that the carrier body is angularly moved in an angular direction ALPHA through a cutting plane intermediate the drive motor of the rotary lawnmower and a surface supporting organic matter thereon (i.e., the cutting plane C-PL) with the first outboard end 30 of the carrier body forming the first leading edge 34 of the carrier body and the second outboard end 32 of the carrier body forming the second leading edge 36 of the carrier body. The longitudinal terminus of the first blade section of the carrier body is at a radial spacing from the rotation drive shaft 20 of the rotary mower 10, and the first blade section forms at least a part of the first leading edge 34 of the carrier body. The carrier body has a topside surface 38 and an underside surface 40 that is in facing relationship to the surface supporting organic matter thereon over which the rotary mower 10 is moved and is spaced from the topside surface 38 of the carrier body as viewed relative to the thickness dimension THK-D of the carrier body in the direction from the rotary mower toward the cutting plane CP-L. The carrier body includes a further working portion 80 that will be described in more detail hereafter.

While the present invention is not intended to be limited to any particular theory concerning the movement and handling of cut stalks within the rotary mower 10, one theory holds that efforts to increase the mulching or shredding capability of a blade or bar should focus on increasing the degree of shredding or mulching within the initial one hundred and eighty (180) degrees of contact of grass stalks to be trimmed with a blade, as this may be the essential distance and time period during which shredding or mulching is most effectively accomplished when mowing with a side discharge mower. To this end, the present invention proposes an approach to increasing the degree of shredding or mulching within the initial one hundred and eighty (180) degrees of contact of grass stalks to be trimmed with the first or second blade sections of the stalk reducer bar 24. This approach involves providing structures on the stalk reducer bar 24 that are intended to capitalize on, or optimally exploit, the contact of the stalk reducer bar with grass stalks to be trimmed within the initial one hundred and eighty (180) degrees of contact with such grass stalks. The first outboard end 30 of the carrier body of the stalk reducer bar 24 specifically configured as the first blade section and the second outboard end 32 of the carrier body of the stalk reducer bar 24 specifically configured as the second blade section are each provided with a mulching/shredding enhancing structure. This mulching/shredding enhancing structure will be described in more detail hereinafter but is representatively shown in FIG. 3 by an arrangement of solid diamond shapes and an arrangement of broken line diamond shapes and this mulching/shredding enhancing structure constitutes the further working portion of the stalk reducer bar 24. This mulching/shredding enhancing structure may beneficially improve the mulching or shredding capability of the stalk reducer bar 24 for the reason that the mulching/shredding enhancing structure interacts with cut stalk segments in a manner that transforms these cut stalk segments into units whose size and/or material properties are favorable to successful mulching or shredding disposal. In this regard, although not intending to be bound by any particular theory, the mulching/shredding enhancing structures may interact with cut stalk segments to partially weaken or fully weaken—i.e., sever—the cut stalk segments along their longitudinal axes (their stalk axes). This effect may be brought about by the rotational and translation movement of the stalk reducer bar 24 with a two-step interaction process in which the cut stalk segments are, in a first step, cut by a respective one of the first or second blade sections and then, in a second step, come into contact with the mulching/shredding enhancing structure in a manner in which the mulching/shredding enhancing structure is able to partially weaken or fully weaken i.e., sever—the cut stalk segments along their longitudinal axes (their stalk axes).

The further working portion of the stalk reducer bar includes a plurality of projections and angular movement of the carrier body in the cutting plane CP-L operates to bring the first blade. Section and the second blade section into stalk cutting engagement with stalks extending from the surface supporting organic matter thereon and operates to bring the plurality of projections of the further working portion into shredding engagement with cut stalk remnants. The further working portion of the stalk reducer bar may be co-extensive with the entire surface area of one or both of the topside 38 and the underside 40 of the bar, may be comprised of a single area of a selected one of the topside 38 and the underside 40 of the bar, or may be comprised of several areas on one or both of the topside 38 and the underside 40 of the bar. A configuration in which the further working portion of the stalk reducer bar is co-extensive with the entire surface area of one or both of the topside 38 and the underside 40 of the bar is schematically shown in FIG. 3 by the arrangement of solid diamond shapes and the arrangement of broken line diamond shapes. Merely by way of illustration, in the following description of the projections of the further working portion of the stalk reducer bar, the further working portion is located on the topside 38 of the carrier body and extends from a nominal height location to a raised height location in the lateral direction LAT-D as viewed in the lateral direction from the leading edge 34 of the carrier body toward the trailing edge at the first outboard end 30 of the carrier body. the raised height location of the further working portion of the carrier body being spaced further from the underside 40 of the carrier body than the nominal height location as viewed relative to the thickness dimension THK-D of the carrier body and each projection of the further working portion of the carrier body projects from the topside 38 of the carrier body in the height direction HEI-D from the cutting plane CP-L toward the top of the deck 28.

Figure 4:
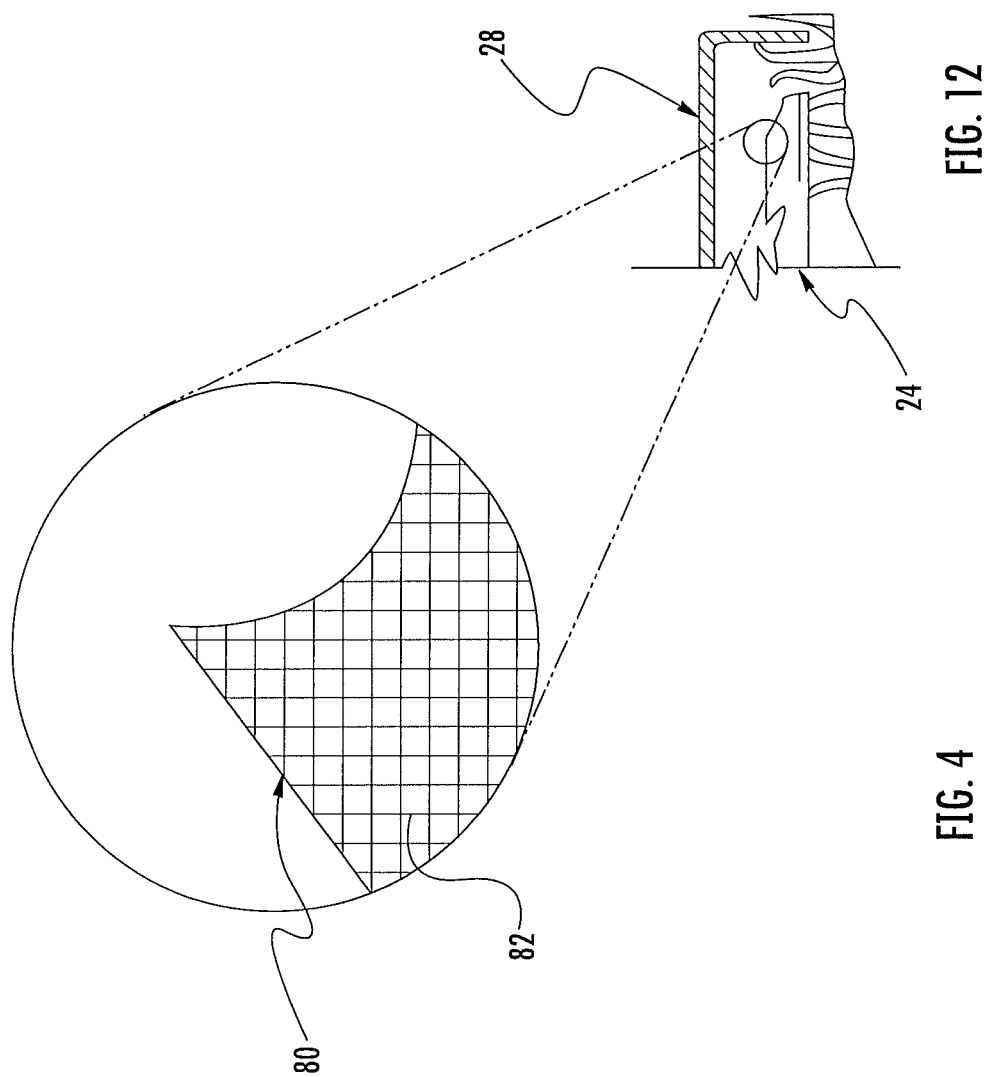
FIGS. 4-11 each show an enlarged perspective view of a portion of a variation of the stalk reducer bar shown in FIG. 3.

Further details of the mulching/shredding enhancing structure of the stalk reducer bar 24 will now be provided with reference to FIG. 12, which is a front elevational sectional view of a portion of the deck 28 of the rotary mower 10 taken along lines XII-XII of FIG. 1 and showing the first blade section of the stalk reducer bar 24 sweeping angular past the portion of the deck 28 to trim grass stalks of varying height, and with reference to FIG. 4, which is an enlarged perspective view of a portion of the stalk reducer bar 24. As seen in FIG. 4, the stalk reducer bar 24 in the form of a carrier body includes a further working portion 80 having a plurality of projections 82. The projections shown in FIG. 4 are configured as a first plurality of raised linear segments arranged perpendicularly to a second plurality of raised linear segments to create an overall knurled pattern. Angular movement of the carrier body in the cutting plane CP-L operates to bring the first blade section into stalk cutting engagement with stalks extending from the surface supporting organic matter thereon and operates to bring the plurality of projections 82 of the further working portion 80 into shredding engagement with cut stalks.

Figure 5:
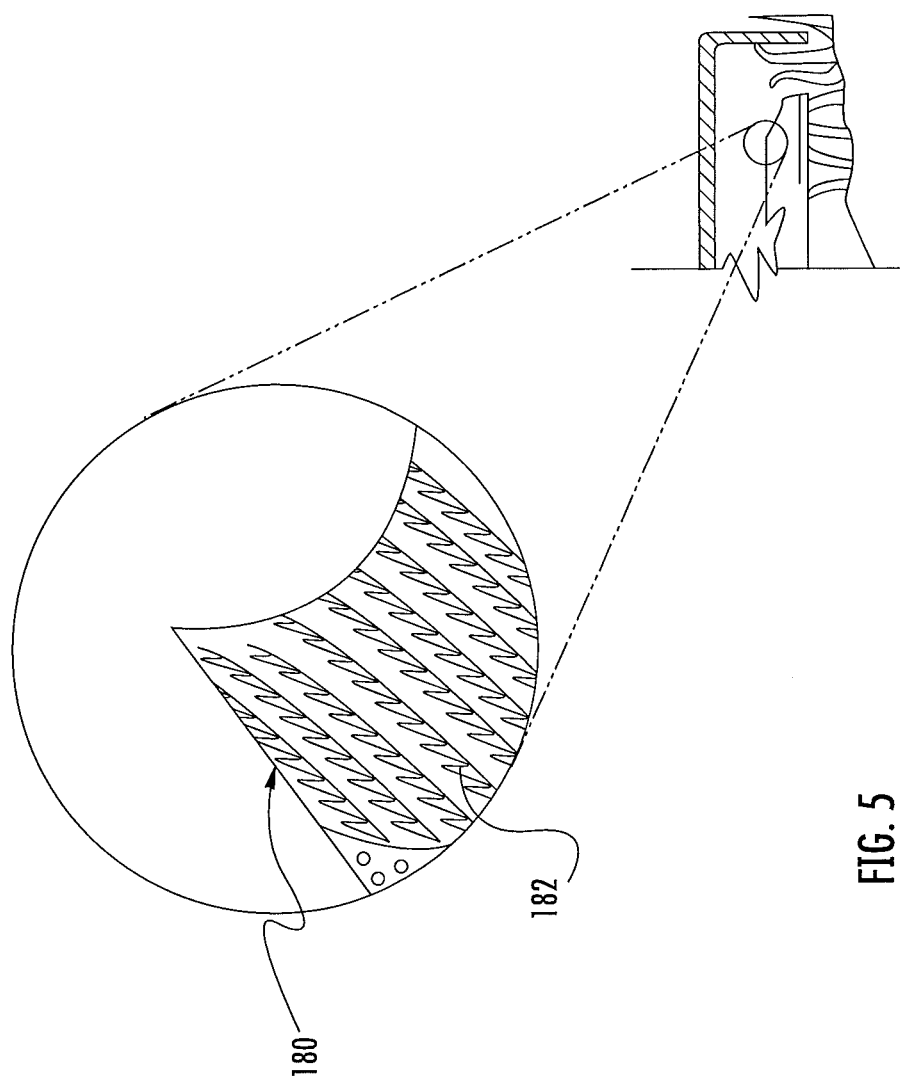

Reference is again had to FIG. 12 with regard to a description of a further variation of the stalk reducer bar 24. As seen in FIG. 5, which is an enlarged perspective view of a portion of the stalk reducer bar 24, the stalk reducer bar 24 in the form of a carrier body can be provided with a further working portion 180 having a plurality of projections 182. The projections shown in FIG. 5 are configured as several rows of hardened teeth with each row of hardened teeth extending from a lowermost terminus on its inward lateral side to an uppermost terminus on its outward lateral side. Each tooth has a length of approximately 0.020 of an inch. Angular movement of the carrier body in the cutting plane operates to bring the first blade section into stalk cutting engagement with stalks extending from the surface supporting organic matter thereon and operates to bring the plurality of projections 82 of the further working portion 80 into shredding engagement with cut stalks.

Figure 6:
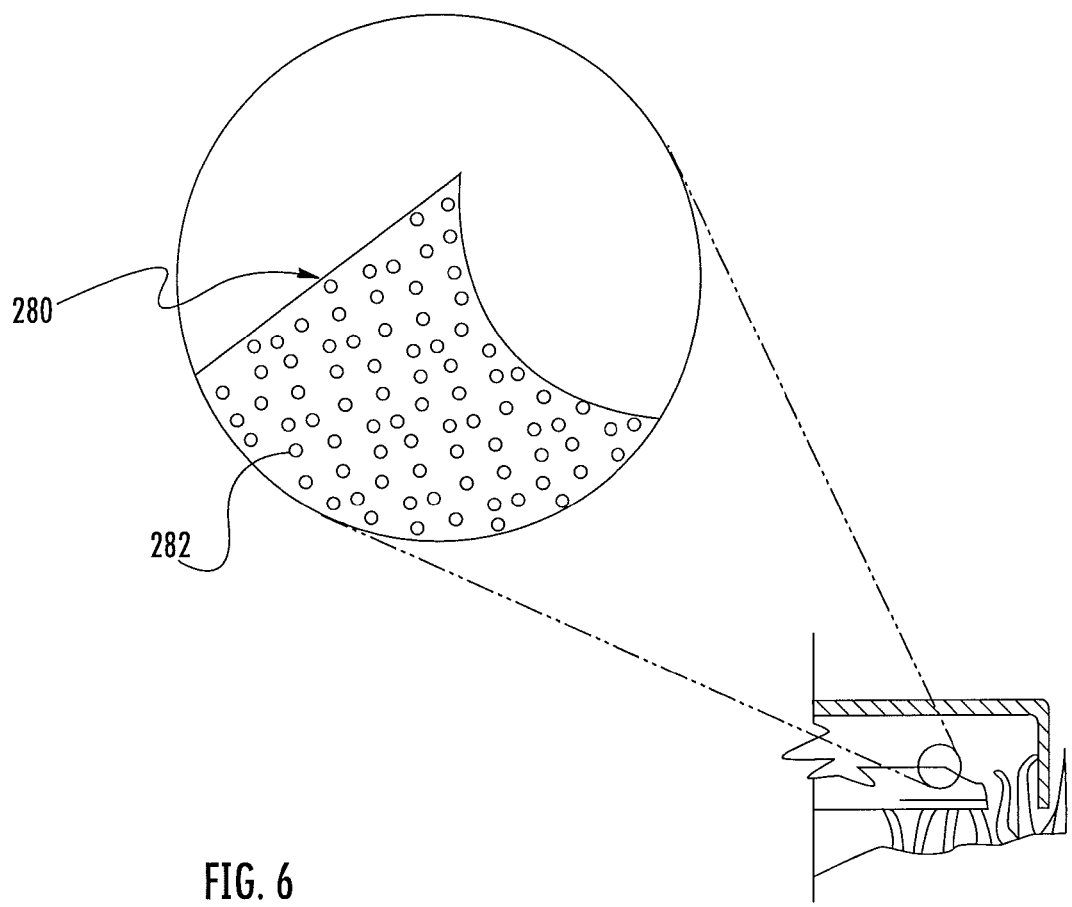

Reference is once again had to FIG. 12 with regard to a description of a further variation of the stalk reducer bar 24. As seen in FIG. 6, which is an enlarged perspective view of a portion of the stalk reducer bar 24, the stalk reducer bar 24 in the form of a carrier body can be provided with a further working portion 280 having a plurality of projections 282. Each of the projections shown in FIG. 6 is a single grit or a clump of grits with the grits being randomly arranged on the stalk reducer bar. The plurality of grits can be applied, for example, via the adhesion of an emery cloth to the stalk reducer bar. Angular movement of the carrier body in the cutting plane operates to bring the first blade section into stalk cutting engagement with stalks extending from the surface supporting organic matter thereon and operates to bring the plurality of projections 282 of the further working portion 280 into shredding engagement with cut stalks.

Figure 7:
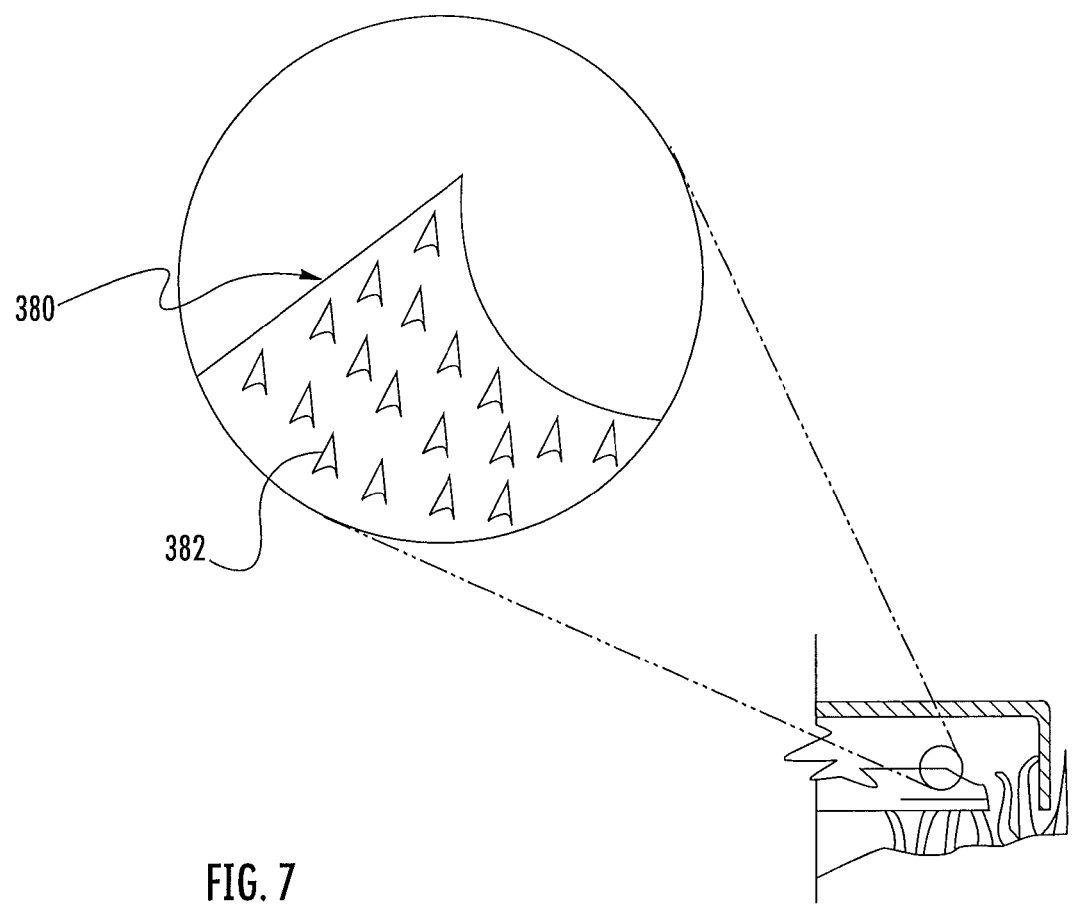

With reference again to FIG. 12, a description of a further variation of the stalk reducer bar 24 is now provided with reference as well to FIG. 7, which is an enlarged perspective view of a portion of the stalk reducer bar 24. The stalk reducer bar 24 is in the form of a carrier body and is provided with a further working portion 380 having a plurality of projections 382. Each of the projections shown in FIG. 7 is a single grit or a clump of grits comprised of aluminum oxide or silicon carbide and the grits may be embedded in an adhesive coating such as polyester or epoxy thermoset resins. Angular movement of the carrier body in the cutting plane operates to bring the first blade section into stalk cutting engagement with stalks extending from the surface supporting organic matter thereon and operates to bring the plurality of projections 382 of the further working portion 380 into shredding engagement with cut stalks.

Figure 8:
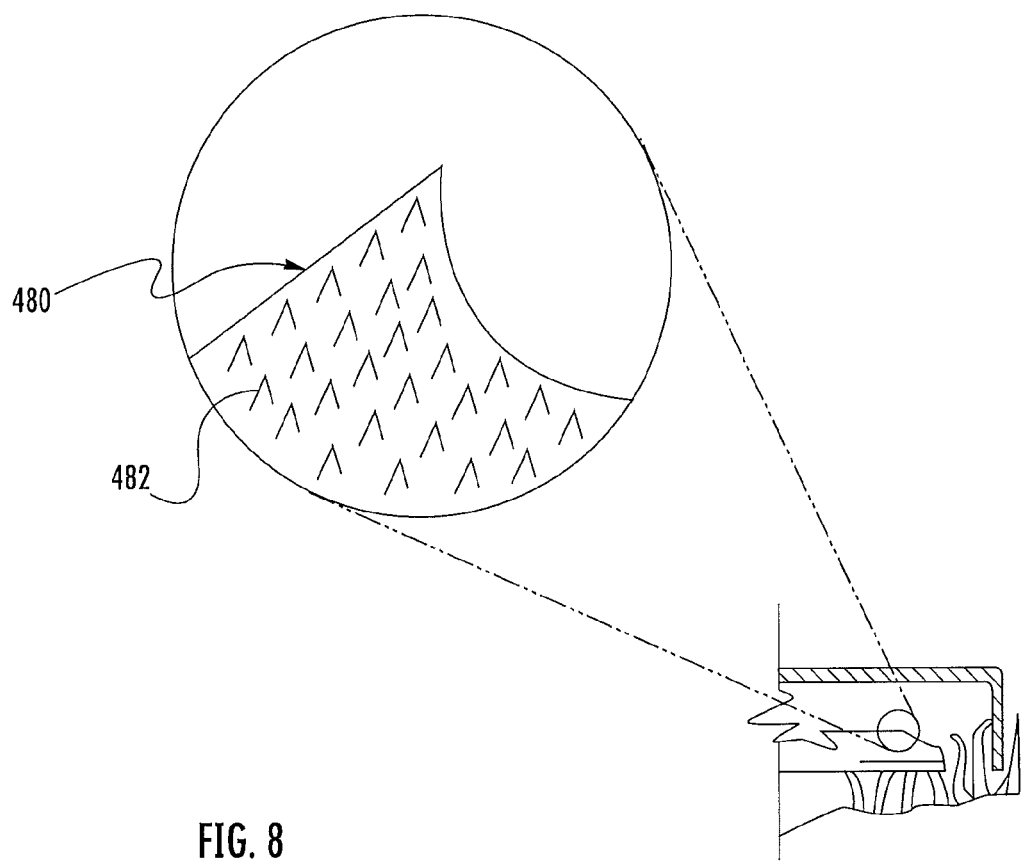

Reference is again had to FIG. 12 with regard to a description of a further variation of the stalk reducer bar 24. As seen in FIG. 8, which is an enlarged perspective view of a portion of the stalk reducer bar 24, the stalk reducer bar 24 in the form of a carrier body can be provided with a further working portion 480 having a plurality of projections 482. The projections shown in FIG. 8 are configured as several rows of upstanding taper pointed projections configured in a manner similar to a cheese grater. Angular movement of the carrier body in the cutting plane operates to bring the first blade section into stalk cutting engagement with stalks extending from the surface supporting organic matter thereon and operates to bring the plurality of projections 482 of the further working portion 480 into shredding engagement with cut stalks.

Figure 9:
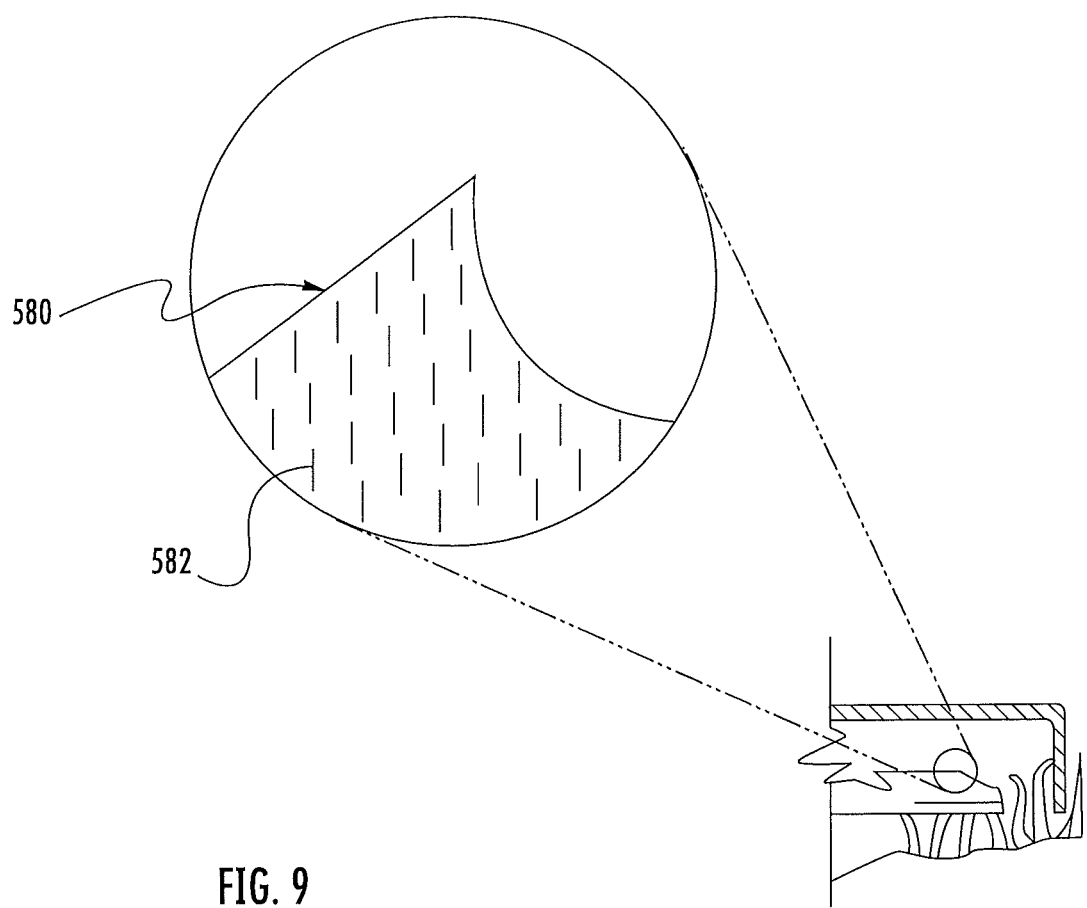

Reference is again had to FIG. 12 with regard to a description of a further variation of the stalk reducer bar 24. As seen in FIG. 9, which is an enlarged perspective view of a portion of the stalk reducer bar 24, the stalk reducer bar 24 in the form of a carrier body can be provided with a further working portion 580 having a plurality of projections 582. The projections shown in FIG. 9 are configured as individually upstanding pins or bristles. Each pin or bristle extends approximately tangentially from the stalk reducer bar 24 and may have a length to and between one-eighth (⅛) of an inch and one quarter (¼) of an inch. Also, each pin or bristle may be approximately 0.010 inches in diameter and may be formed of steel, stainless steel, or any suitable flexible rigid material with exemplary flex life and abrasion resistance. Angular movement of the carrier body in the cutting plane operates to bring the first blade section into stalk cutting engagement with stalks extending from the surface supporting organic matter thereon and operates to bring the plurality of projections 582 of the further working portion 580 into shredding engagement with cut stalks.

Figure 10:
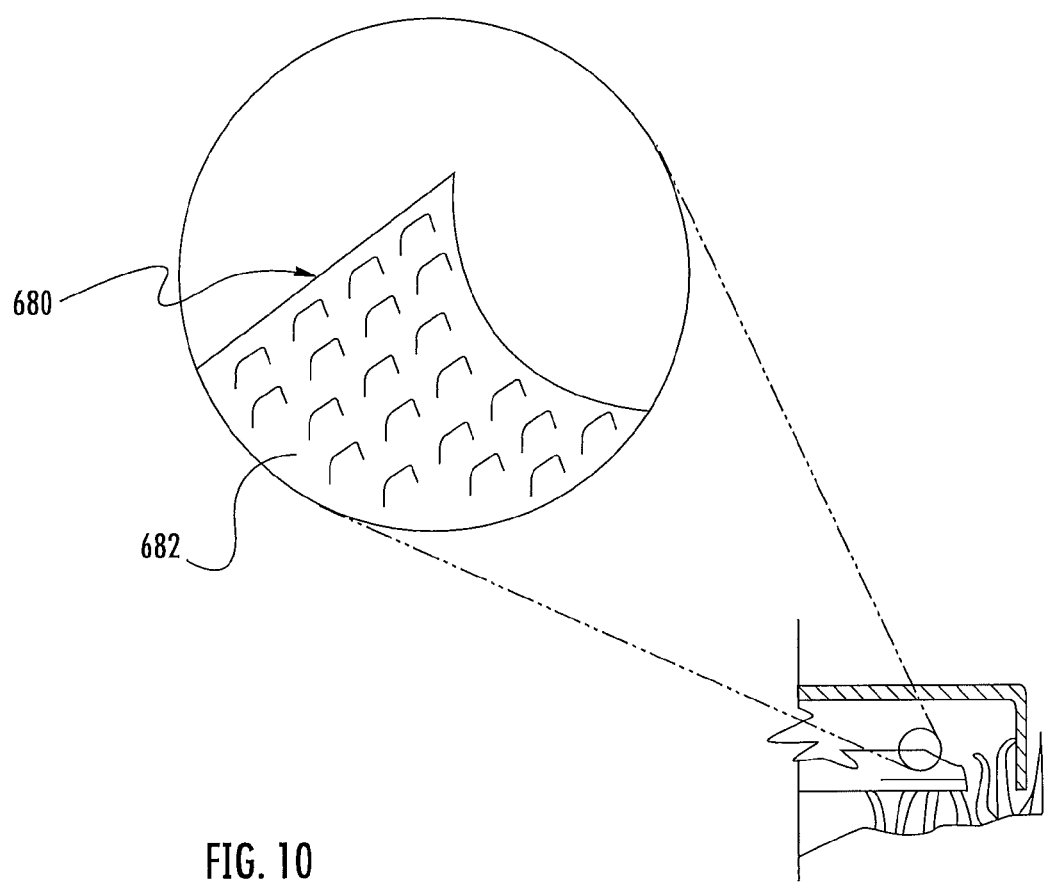

Reference is again had to FIG. 12 with regard to a description of a further variation of the stalk reducer bar 24. As seen in FIG. 10, which is an enlarged perspective view of a portion of the stalk reducer bar 24, the stalk reducer bar 24 in the form of a carrier body can be provided with a further working portion 680 having a plurality of projections 682. The projections shown in FIG. 10 are configured as several rows of upstanding concave sharp edged elliptical sections such as sections typically found on a wood rasp. These upstanding sections are preferably formed of a hardened material. Angular movement of the carrier body in the cutting plane CP-L operates to bring the first blade section into stalk cutting engagement with stalks extending from the surface supporting organic matter thereon and operates to bring the plurality of projections 682 of the further working portion 680 into shredding engagement with cut stalks.

Figure 11:
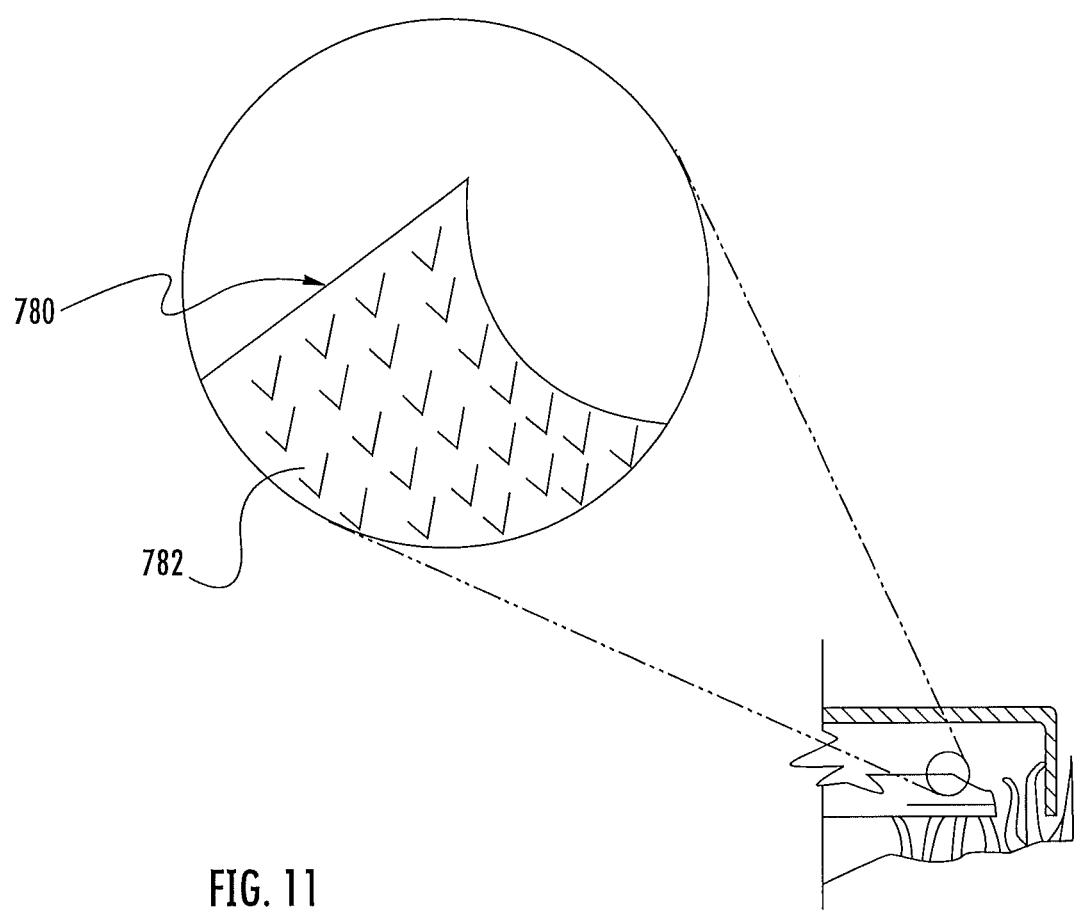

Reference is once again had to FIG. 12 with regard to a description of a further variation of the stalk reducer bar 24. AS seen in FIG. 11, which is an enlarged perspective view of a portion of the stalk reducer bar 24, the stalk reducer bar 24 in the form of a carrier body can be provided with a further working portion 780 having a plurality of projections 782. Each of the projections shown in FIG. 11 is a single rake blade gouge with the gouges being randomly arranged on the stalk reducer bar. Each rake blade gouge is preferably triangularly shaped. Angular movement of the carrier body in the cutting plane CP-L operates to bring the first blade section into stalk cutting engagement with stalks extending from the surface supporting organic matter thereon and operates to bring the plurality of projections 782 of the further working portion 780 into shredding engagement with cut stalks.

Figure 14:
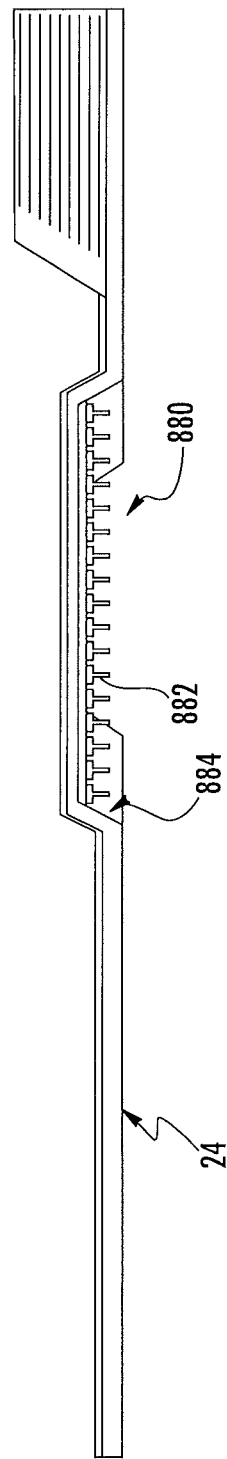
FIG. 14 is a side elevational view of the portion of the stalk reducer bar shown in FIG. 13.

Reference is now had to FIGS. 13 and 14 with regard to a description of an alternative variation of the stalk reducer bar 24. As seen in FIG. 13, which is a bottom elevational view of a portion of the stalk reducer bar, and as seen in FIG. 14, which is a side elevational view of the portion of the stalk reducer bar shown in FIG. 13, the stalk reducer bar 24 in the form of a carrier body can be provided with a further working portion 880 having a plurality of projections 882. Each of the projections shown in FIGS. 13 and 14 is a pin or bristle. Each pin or bristle extends approximately tangentially from the stalk reducer bar 24 and may have a length to and between one-eighth (⅛) of an inch and one quarter (¼) of an inch. Also, each pin or bristle may be approximately 0.010 inches in diameter and may be formed of steel, stainless steel, or any suitable flexible rigid material with exemplary flex life and abrasion resistance. The pins or bristle are disposed in a recess 884 formed in the underside 40 of the stalk reducer bar and each projection of the further working portion 880 projects from the underside 40 of the carrier body in the height direction HEI-D from the rotary mower 10 toward the cutting plane CP-L. Angular movement of the carrier body in the cutting plane CP-L operates to bring the first blade section into stalk cutting engagement with stalks extending from the surface supporting organic matter thereon and operates to bring the plurality of projections 882 of the further working portion 880 into shredding engagement with cut stalks. Although the projections 882 of the stalk reducer bar 24 described with respect to FIGS. 13 and 14 have been described as being comprised of pins or bristles, it is also contemplated that the projections 882 can alternatively be formed of any suitable geometries, materials, or patterns, whereupon, for example, the projections may form an overall knurled pattern or may be as configured several rows of hardened teeth with each row of hardened teeth extending from a lowermost terminus on its inward lateral side to an uppermost terminus on its outward lateral side. As another example, each of the projections may be in the form of a single grit or a clump of grits with the grits being randomly arranged on the stalk reducer bar and the single grit or a clump of grits may be optionally comprised of aluminum oxide or silicon carbide and/or may be embedded in an adhesive coating such as polyester or epoxy thermoset resins. As a further example, the projections may be configured as several rows of upstanding taper pointed projections configured in a manner similar to a cheese grater or the projections may be configured as several rows of upstanding concave sharp edged elliptical sections. As an additional example, each of the projections may be in the form of a single rake blade gouge with the gouges being randomly arranged on the stalk reducer bar.

Figure 15:
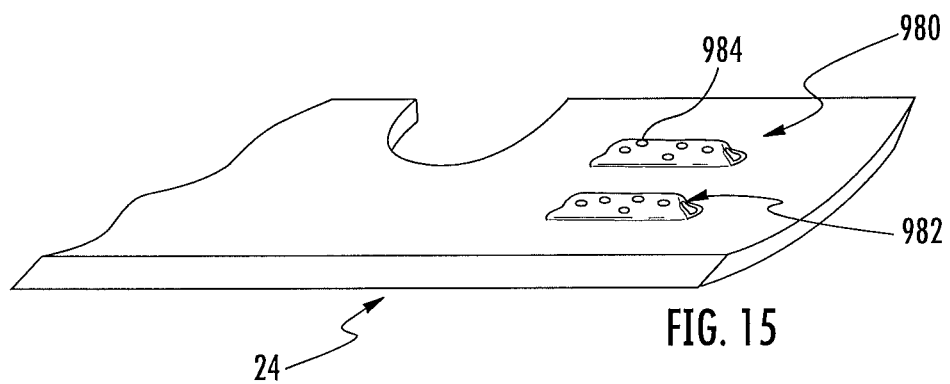
FIG. 15 is an enlarged perspective view of a portion of the stalk reducer bar of a further alternative variation of the stalk reducer bar.

Reference is now had to FIG. 15 with regard to a description of a further alternative variation of the stalk reducer bar 24. As seen in FIG. 15, which is an enlarged perspective view of a portion of the stalk reducer bar, the stalk reducer bar 24 in the form of a carrier body can be provided with a further working portion 980 having a plurality of projections 982. Each of the projections 982 is formed by a stamping process during the manufacturing of the stalk reducer bar 24 whereby an extent of blade material is stamped partially outwardly in a controlled manner to result in the formation of an elongate projection in the working portion 980. The leading edge of each projection 982 has a plurality of grits 984 secured thereto to enhance the stalk reducing capability of the projection.

Figure 16A:
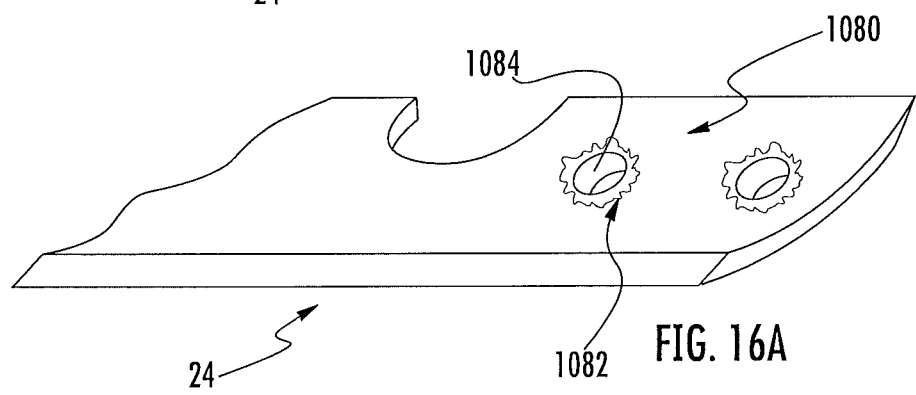
FIGS. 16A and 16B are each an enlarged perspective view of a portion of the stalk reducer bar of an additional alternative variation of the stalk reducer bar.
Figure 16B:
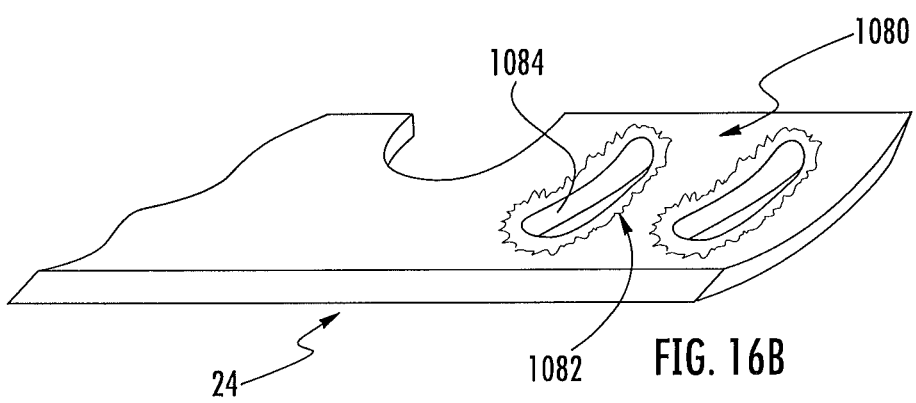

Reference is now had to FIGS. 16A and 16B with regard to a description of an additional alternative variation of the stalk reducer bar 24. As seen in FIGS. 16A and 16B, each of which is an enlarged perspective view of a portion of the stalk reducer bar, the stalk reducer bar 24 in the form of a carrier body can be provided with a further working portion 1080 having a plurality of projections 1082. The projections 1082 are formed by a stamping process during the manufacturing of the stalk reducer bar 24 whereby an extent of blade material is stamped fully outwardly so as to be separated from the stalk reducer bar. The stamping process produces a void 1084 or a plurality of voids and these voids can be of any desired geometry such as, for example, of a generally annular shape as shown in FIG. 16A or of a generally elongate shape such as shown in FIG. 16B. The stamping process is performed to purposefully result in the formation of flashing along the top edges of the voids 1084—that is, material that has been displaced outwardly of the unstamped surface of the working portion 1080 and remains connected to the stalk reducer bar. This flashing is preferably characterized by jagged or irregular edges that project upwardly and which can thus engage and reduce stalk remnants. In lieu of a stamping process, other suitable flash forming processes can be used such as, for example, a milling process.

Figure 17:
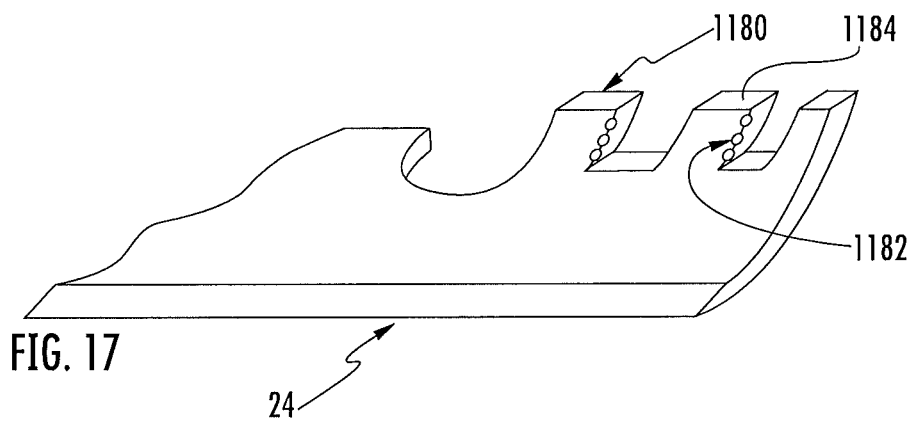
FIG. 17 is an enlarged perspective view of a portion of the stalk reducer bar of a yet another alternative variation of the stalk reducer bar.

Reference is now had to FIG. 17 with regard to a description of a further alternative variation of the stalk reducer bar 24. As seen in FIG. 17, which is an enlarged perspective view of a portion of the stalk reducer bar, the stalk reducer bar 24 in the form of a carrier body can be provided with a further working portion 1180 having a plurality of projections allocated in separate groups each mounted on a respective tooth. The longitudinal terminus of each of the first blade section and the second blade section is formed with a plurality of teeth 1184 projecting upwardly at the back edge of the stalk reducer bar and each tooth 1184 has a plurality of projections 1182 in the form of a continuous serrated structure on the lateral outward edge of the tooth.

Figure 18:
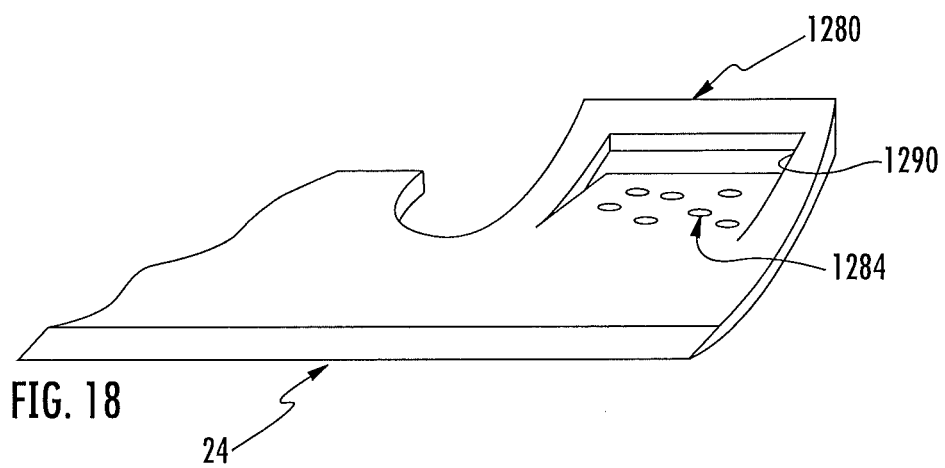
FIG. 18 is an enlarged perspective view of a portion of the stalk reducer bar of a variation of the further working portion of the stalk reducer bar.

The first outboard end 30 of the carrier body of the stalk reducer bar 24 and the second outboard end 32 of the carrier body of the stalk reducer bar 24 are each shown in FIG. 2 as having an upsweep configuration whereby the outboard edge rises slightly but continuously from the cutting edge toward the back edge and the variations of the further working portion 80 described in FIGS. 4-17 disclose the placement of the projections on the top surface of this upswept configuration of the outboard ends 30, 32 of the stalk reducer bar. However, it is also contemplated the stalk reducer bar 24 can alternatively be configured with the first outboard end 30 and the second outboard end 32 each having an overall upswept configuration but with the variation that the further working portion comprised in each outboard end on which the projections are placed being configured as a planar surface with no upsweep from the cutting edge toward the back edge, this being deemed to be a configuration having a flat back edge. As seen in FIG. 18, which is an enlarged perspective view of a portion of the stalk reducer bar, the further working portion of this variation-designated as the further working portion 1280, is configured as a planar surface with no upsweep from the cutting edge toward the back edge and the further working portion 1280 may be formed, for example, by cutting a flap of material out of the outboard end and bending a border portion of the outboard end into an upswept configuration. The further working portion 1280 is disclosed having a plurality of grits 1284 secured thereon of the type described with respect to FIG. 7, although any suitable projection configuration can be deployed instead of the grits. An air gap is 1290 formed between the further working portion 80FLAT and the upswept back edge of the surrounding border portion of the outboard end and this permits air to pass therethrough at an increased velocity.

The structures provided on the stalk reducer bar 24 to enhance the shredding capability of the bar can be created in any suitable manner. For example, with regard to such structures as raised gouges that are integrally formed from the same material comprising the remainder of the bar, these structures can be formed, for example, at the same time that the bar is formed via stamping or casting, for example, or may be worked into a stamped or cast bar blank via any suitable after-working approach such as etching. With regard to those structures provided on the stalk reducer bar 24 to enhance the shredding capability of the bar that are intended to be secured to a bar blank, such securement can be effected in any suitable manner. For example, each projection can be permanently attached to the bar. Alternatively, each projection can be formed as a separate attachable section that can be attached via, for example, adhesive, press fit, or any other attachment means to the bar. As a variation of the separate attachable section approach, the entire group of the projections or discrete sub-groups of the projections may be collectively formed as separate attachable sections. Suitable attachment approaches may include: threaded attachment (screws formed integral with the projections and threaded into tapped holes or bolts passed through bores in the bar or the projections and threadably engaged with the other), welding, adhesive, brazing, retaining slots, or embossing.

Figure 19A:
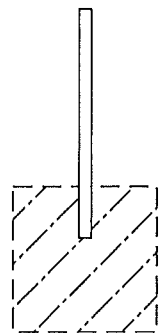
FIGS. 19A-C are each a top perspective view of a respective variation of an individual projection of the stalk reducer bar of the present invention.
Figure 19B:
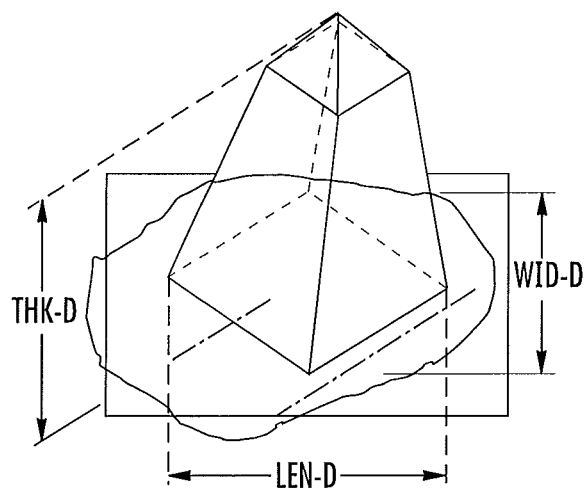
Figure 19C:
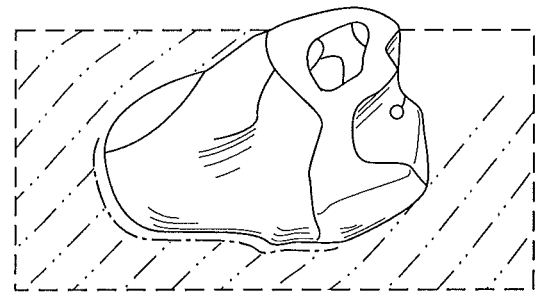

A projection is an area of the stalk reducer blade 24 whose height in the thickness THK-D dimension is greater than five times (5×) the height of an adjacent area that encircles the projection and is immediately adjacent the base of the projection. Reference is now had to FIG. 19, which is a top perspective view of three variations of individual projections of the stalk reducer bar of the present invention showing, in FIG. 19A, a schematic enlarged view of a pin or bristle such as described with respect to FIG. 9, showing, in FIG. 19B, a schematic enlarged view of a hardened tooth such as described with respect to FIG. 8, and showing, in FIG. 19C, a schematic enlarged view of an individual grit such as described with respect to FIG. 7. The width of an individual projection in the width dimension WID-D relative to the width of the stalk reducer blade 24 may, in certain circumstances, be in a ratio of 1:50 or, in other circumstances, be in a ratio of 1:100 or, in further circumstances, be in a ratio of less than 1:200. The width of an individual projection in the width dimension WID-D relative to the height of the projection in the thickness dimension THK-D may, in certain circumstances, be in a ratio of 4:1 or, in other circumstances, be in a ratio of 2: or, in further circumstances, be in a ratio of less than 1:100. The width of an individual projection such as, for example, a bristle or pin as schematically illustrated in FIG. 9, relative to the width of the stalk reducer blade 24 may, in certain circumstances, be in a ratio of less than 1:200 and, as well, the width of the projection in the width dimension WID-D relative to the height of the projection in the thickness dimension THK-D may be in a ratio of less than 1:100. Furthermore, with continued reference to the pins or bristles shown in FIG. 9, projections deployed in a stalk reducer bar of the present invention such as, for example, pins or bristles may be arranged on the stalk reducer bar such that there are at least four (4) projections laterally spaced from one another in the width dimension WID-D or, in other circumstances, at least eight (8) projections laterally spaced from one another in the width dimension WID-D or, in further circumstances, at least twenty (20) projections laterally spaced from one another in the width dimension WID-D. It is also contemplated that any of the projections deployed in a stalk reducer bar of the present invention may be located on another structure that itself projects from the stalk reducer bar in the thickness dimension THK-D.

The arrangement of the structures provided on the stalk reducer bar 24 to enhance the shredding capability of the bar can be selected according to any desirable performance or assembly criteria. For example, the structures can be arranged to beneficially influence air flow in any selected direction. It should be noted that the features described above can be varied to optimize the combined mulching and shredding capability for specific cutting applications and to work in conjunction with different mounting and deck configurations. Furthermore, the features described above could be incorporated on one end of a "half-blade" configuration (i.e., a flail blade or a rotary cutter) wherein the blade mounts to the rotation drive shaft of a mower at one end and the mulching or shredding operations are performed by the other end of the blade.

It will be appreciated that the above-described features may be implemented during the manufacturing of mowers according to the invention. In addition, a significant advantage provided by the present invention is that it can be applied to preexisting mowers. For example, with a method according to the invention, it is possible to remove a horizontal cutting blade and replace it with a stalk reducer bar that includes mulching/shredding enhancement structures as described above. Alternatively, a conventional horizontal cutting blade may be modified to include the mulching/shredding enhancement structures as described above.

Other variations in the shape and design of the mower or assembly supporting the stalk reducer bar are possible based on the general principles and teachings provided herein. For example, the mower or assembly can be formed from a thin, metal plate, such as stainless steel, or include lightweight material, such as plastic, polymers, or the like. The particular construction will depend, in part, on the particular application in which the stalk reducer bar is to be used.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

What is claimed is:

1. An apparatus attachable for rotation to a motor of a rotary mower for shredding stalk segments from organic matter extending upwardly from a bed, the apparatus comprising:
 a bar having:
  a longitudinally extending first blade section, the first blade section having a leading edge and defining a cutting plane substantially parallel to the bed;
  a working portion disposed above the cutting plane relative to the bed, the working portion having a first side and a second side generally opposite the first side, the working portion defining at least one void in communication with the first side and the second side thereof; and
  a plurality of projections disposed on the working portion; and a drive connect portion connected to the bar adapted to connect the bar to the motor of the rotary mower for rotation in a rotation axis, wherein the leading edge of the first blade section is defined relative to the direction of rotation of the bar about the rotation axis;

wherein the plurality of projections are disposed rearwardly of the leading edge relative to the direction of rotation of the bar about the rotation axis; and wherein rotation of the bar about the rotation axis brings the first blade section into cutting engagement with the stalk segments and thereafter, the plurality of projections of the working portion into shredding engagement with cut stalk segments cut by the first blade section.

2. The apparatus of claim 1, wherein the projections have a configuration selected from the group consisting of a knurled pattern, rows of hardened teeth, grits, rows of upstanding taper points, upstanding pins or bristles, upstanding concave sharp edged elliptical sections, and rake blade gouges.

3. The apparatus of claim 1, wherein the projections are disposed on the first side of the working portion.

4. The apparatus of claim 1, wherein the void is of a generally annular shape.

5. The apparatus of claim 1, wherein the void is of a generally elongate shape.

6. The apparatus of claim 5, wherein the void extends generally parallel to the first blade section.

7. The apparatus of claim 1, wherein the working portion includes flashing around edges of the void.

8. The apparatus of claim 1 further comprising a trailing edge generally opposite the first blade section, wherein the working portion defines an upsweep from the first blade section toward the trailing edge.

9. The apparatus of claim 8, wherein the second side faces the bed.

10. The apparatus of claim 1 further comprising a trailing edge generally opposite the first blade section, wherein the working portion defines at least two segments, the first portion defining an upsweep from the first blade section toward the trailing edge and the second portion being configured as a planar surface;

wherein the second section is cut or stamped from the first section; and wherein the void is defined as a gap between the first section and the second section.

11. An apparatus attachable for rotation to a motor of a rotary mower for shredding stalk segments from organic matter extending upwardly from a bed, the apparatus comprising:

a bar having:

a longitudinally extending first blade section and a trailing edge generally opposite the first blade section, the first blade section having a leading edge and defining a cutting plane substantially parallel to the bed;

a working portion disposed above the cutting plane relative to the bed, the working portion having a first side, a second side generally opposite the first side, and an upsweep from the first blade section toward the trailing edge; and a plurality of teeth projecting upwardly from the working portion at the trailing edge, at least one tooth having a plurality of projections disposed thereon in the form of a continuous serrated structure on a lateral outward edge of the tooth; and a drive connect portion connected to the bar adapted to connect the bar to the motor of the rotary mower for rotation in a rotation axis, wherein the leading edge of the first blade section is defined relative to the direction of rotation of the bar about the rotation axis; and wherein rotation of the bar about the rotation axis brings the first blade section into cutting engagement with the stalk segments and thereafter, the plurality of projections of the working portion into shredding engagement with cut stalk segments cut by the first blade section.

12. The apparatus of claim 11, wherein the projections disposed on the plurality of teeth in the form of a continuous serrated structure are first projections; and wherein the working portion further comprises a plurality of second projections disposed thereon, the second projections having a configuration selected from the group consisting of a knurled pattern, rows of hardened teeth, grits, rows of upstanding taper points, upstanding pins or bristles, upstanding concave sharp edged elliptical sections, and rake blade gouges.

13. A rotary mower for cutting stalk segments from organic matter extending upwardly from a bed, comprising:

a deck;

a motor connected to the deck;

a bar connected to the motor for shredding the stalk segments, the bar having:

a longitudinally extending first blade section, the first blade section having a leading edge and defining a cutting plane substantially parallel to the bed;

a working portion disposed above the cutting plane relative to the bed, the working portion having a first side and a second side generally opposite the first side, the working portion defining at least one void in communication with the first side and the second side thereof; and a plurality of projections disposed on the working portion, wherein the leading edge of the first blade section is defined relative to the direction of rotation of the bar about the rotation axis;

wherein the plurality of projections are disposed rearwardly of the leading edge relative to the direction of rotation of the bar about the rotation axis; and wherein rotation of the bar about the rotation axis brings the first blade section into cutting engagement with the stalk segments and thereafter, the plurality of projections of the working portion into shredding engagement with cut stalk segments cut by the first blade section.

14. The rotary mower of claim 13, wherein the projections have a configuration selected from the group consisting of a knurled pattern, rows of hardened teeth, grits, rows of upstanding taper points, upstanding pins or bristles, upstanding concave sharp edged elliptical sections, and rake blade gouges.

15. The rotary mower of claim 13, wherein the projections are disposed on the first side of the working portion.

16. The rotary mower of claim 13, further comprising a trailing edge generally opposite the first blade section, wherein the working portion defines an upsweep from the first blade section toward the trailing edge.

17. The rotary mower of claim 16, wherein the second side faces the bed.

18. The rotary mower of claim 13, further comprising a trailing edge generally opposite the first blade section, wherein the working portion defines at least two segments, the first portion defining an upsweep from the first blade section toward the trailing edge and the second portion being configured as a planar surface;

wherein the second section is cut or stamped from the first section; and wherein the void is defined as a gap between the first section and the second section.

* * * * *